May 24, 1949.
A. KENNEDY
2,471,219
PHOTOFLASH SYNCHRONIZER WITH TRIPPER-OPERATED
SAFETY SWITCH
Filed Dec. 3, 1946
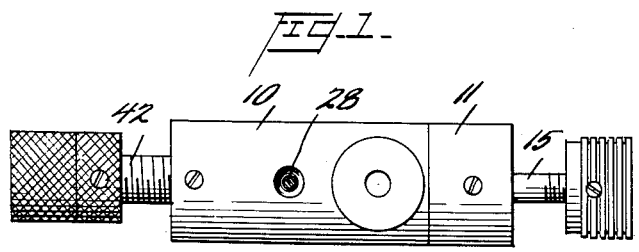
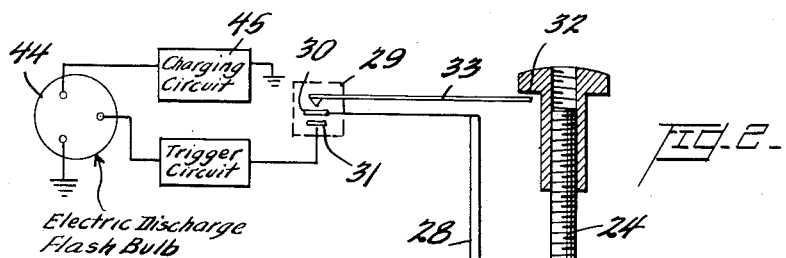
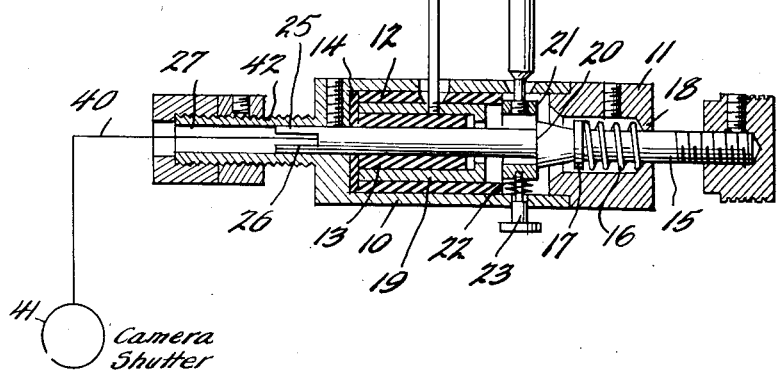
Inventor
Arthur Kennedy,
By J. R. Paris. Attorney Patented May 24, 1949

2,471,219

UNITED STATES PATENT OFFICE 2,471,219

PHOTOFLASH SYNCHRONIZER WITH TRIPPER-OPERATED SAFETY SWITCH

Arthur Kennedy, Wood-Ridge, N. J., assignor to A. F. Smuckler and Charles C. Cullen, doing business as A. F. Smuckler & Company, New York, N. Y.

Application December 3, 1946, Serial No. 713,645

2 Claims. (Cl. 95—11.5)

This invention relates to photoflash photography and more particularly to a device for synchronizing the shutter operation with the flash produced by a photoflash bulb.

One object of this invention is to produce a sturdy and compact device which, when used in conjunction with a camera and a circuit for energizing a photoflash bulb, will enable the operator to work the camera shutter and the flash bulb synchronously by a single operation upon one trigger mechanism, designed to control the operation of the two sections of the photographic unit.

A further object of this invention is to produce a trigger mechanism for the synchronous release of a camera shutter and discharge of a photoflash bulb wherein the action upon the camera shutter is initiated before the flash bulb is energized. The movable operating rod of the present device is mechanically connected to the shutter release mechanism of the camera, such that its forward and positive movement, from withdrawn or cocked to retracted position, operates the shutter release mechanism. The completion of this operational stroke also effects electrical contact between the rod and a conducting element which is connected to the control circuit used to energize the flash bulb, such as shown in my application Serial No. 674,137 filed June 3, 1946. Thus, this trigger device is similar to a switch where mechanical action first operates the camera shutter release mechanism while the completion of this stroke closes the control circuit of the flash bulb.

Other objects and advantages of this invention will be more clearly understood from the description which follows, and the accompanying drawings.

Fig. 1 is an enlarged elevation view of the synchronizer.

Fig. 2 is an enlarged longitudinal sectional view thereof, together with a schematic illustration of the system.

The operational parts of this synchronous trigger release mechanism for photoflash cameras are substantially enclosed in an elongated, metallic, cylindrical casing in which is longitudinally and slidably mounted a cylindrical rod. This rod is the operational crux of the mechanism, for it is its action which operates the camera shutter and also closes the control circuit of the flash bulb.

Positioned around this operating rod is a helical spring whose ends are enclosed between a shoulder formed on the rod and one end of the outer casing of the mechanism. One end of said rod protrudes through and beyond an opening in that end of the outer casing which forms one enclosure for the above mentioned helical spring. When the rod is manually pulled to extend farther from the casing, the helical spring is compressed so that when the rod is released it will be driven, by the spring action, back to its original position.

This mechanism includes, as one of its parts, a latch to hold the rod in place when it has been withdrawn so as to bring the helical spring into a compressed position, this position being referred to as the cocked position of the device. The latch mechanism is substantially annular in shape and somewhat loosely fitted in the transverse plane. To cooperate with said latch, the operating rod is equipped with a tapered shoulder whose base has but a slightly smaller diameter than the inside diameter of the latch. A small spring is seated between the outer casing and the latch so positioned as to always bear transversely upon the latch. Thus when the elongated rod is withdrawn against the helical spring, the tapered shoulder passes through the circular opening in the latch, tapered end first, until the base of said shoulder has been drawn completely through the latch. At which time the above mentioned latch spring causes said latch to be transversely displaced in its seat such that when the elongated rod is released and permitted to respond to the pressure of the compressed helical spring, it is mechanically held in position by the base of the tapered shoulder engaging a portion of the displaced latch. The apparatus is thus held in a cocked position.

The releasing of the mechanism from its cocked position is accomplished by means of a latch release or tripper arm. The tripper arm enters the casing normally and is secured to the latch at a point directly opposite to that where the latch spring is positioned. Consequently, when the tripper arm is pressed inwardly upon the latch, said latch is displaced transversely against its spring until it is no longer in engagement with the tapered shoulder of the rod, whereby the rod is released to respond to the pressure of the compressed helical spring and advance to its retracted position.

During the action of the rod moving from its cocked to its retracted position, the camera shutter is tripped or released. To this end, one end of a flexible cable or any other suitable means is attached to that end of the rod not employed in the cocking operation, while the other end of this cable is connected to the release mechanism of the camera shutter. Hence the movement of the rod in its operational stroke, being transmitted to the flexible cable and then to the camera shutter release mechanism, causes the shutter to be operated. The shutter release apparatus, as comprising a flexible cable to work in conjunction with the release apparatus in the camera, is conventional and well known and need not be described here.

In addition to releasing the camera shutter, the operational stroke of the rod closes a control circuit whereby the flash bulb is energized in timed relation to the shutter operation. To accomplish this end, a cylindrical electrical conductor is fitted in one portion of the casing sheathing the operating rod in that area. It is electrically connected to the above mentioned control circuit but is electrically insulated from both the rod and the casing. Said cylinder is so positioned within the casing so that when the operating rod is released from its cocked position and is driven through its operational movement its tapered shoulder engages the end of the cylinder. Said engagement, marking the end of the operational stroke of the operating rod, is referred to as the retracted position. By means of this contact, the flash bulb control circuit is completed to ground through the cylinder and the operating rod to the outer casing of the device.

Thus, in the operation of this photoflash synchronizing device, the apparatus is cocked by manually withdrawing the operating rod against a helical spring until a tapered shoulder of the rod engages an annular latch. The discharge of this apparatus is accomplished by releasing the tapered shoulder from the latch permitting the helical spring to drive the rod forward. The forward movement of this rod operates the camera shutter while at the end of its stroke it grounds the control circuit. Consequently, the results of this synchronizing device are to open the camera shutter and while it is open to cause the flash bulb to be discharged, as particularly set forth in the application Serial No. 674,137.

Referring to the diagram, numbers 10 and 11 represent two portions of the outer casing of this photoflash synchronizing device, the two parts fitting together to form a unified casing. Fitted into part 10 of the casing are two cylindrical electrically insulating elements 12 and 13 and the insulating disc 14. Enclosed between the two insulating elements 12 and 13 is the electrical conductor 19, which may be of any suitable form, and is shown in its preferred cylindrical form. Longitudinally and slidably mounted in the outer casing is rod 15 which has been referred to above as the operating rod. Mounted on rod 15 is the helical spring 16 whose ends are enclosed between shoulder 17 of rod 15 and section 18 of casing 11.

The diagram shows the device in its cocked or withdrawn position with tapered shoulder 20 being engaged at its base portion by latch 21 substantially annular in shape, thus holding helical spring 16 in a compressed state. Latch 21 is maintained in its off center position, enabling it to act as catch upon shoulder 20, by means of spring 22, said spring being compressed between latch 21 and casing 10 so as to displace the latch slightly in the transverse plane of its seat. Spring 22 is in turn held in position by thumb screw 23, secured to latch 21 and slidably passing through a suitable opening in casing 10.

To accomplish a release of the mechanism from its cocked position, causing the apparatus to operate so as to synchronously release a camera shutter and cause a flash bulb to be discharged, the operator presses tripper rod 24, secured to latch 21, opposite spring 22, through a suitable opening in casing 10. This operation causes a transverse movement of the latch against the force of spring 22 until the central opening of the latch, having a diameter slightly greater than that of the base of tapered shoulder 20, coincides with shoulder 20 leaving rod 15 free to respond to the pressure of compressed spring 16. The force of this spring causes rod 15 to move forward until shoulder 20 abuts the cylindrical conductor 19, this position being referred to as retracted position.

End 25 of rod 15 is adapted, by means of the recess 26 therein, to accomplish the camera shutter operation during the operational stroke of this rod. Recess 26, or any other suitable structure at end 25 of rod 15, receives one end of a flexible cable 40, or the like, through passage 27 in the externally threaded projection 42 integral with casing 10. The other end of the cable is attached to the shutter release mechanism of camera 41. The flexible cable and the shutter release mechanism are of a conventional and well known design and need not be described here. Thus, in the forward movement of rod 15 from its cocked to its retracted position, the inner slidable portion of a conventional flexible cable attachment for a shutter release mechanism is forced forward therewith causing the end attached to the camera's shutter release mechanism to act upon it to operate the shutter.

At the close of the operational stroke of rod 15, the camera shutter release mechanism having been tripped, shoulder 20 comes in engagement with cylinder 19 effecting the completion of the control or trigger circuit 43 of the flash bulb 44. Electrically conducting cylinder 19 is connected through metal rod 28 and microswitch 29 to the control or trigger circuit 43 used to condition the flash bulb 44 so that it is flashed or energized by the charging circuit 45. With switch 29 closed, contact between shoulder 20 of rod 15 and cylinder 19, otherwise completely insulated from the outer casing by insulating units 12, 13, and 14, grounds cylinder 19 and the control circuit 43 to the outer casing of the synchronizing apparatus.

The flash bulb and the circuits employed for energizing same are fully described in patent application bearing Serial Number 674,137. The circuits consist of a charging circuit, in which a sufficient charge is built up to discharge through the flash bulb and may be held in readiness for operation, and a trigger circuit which is used to initiate the operation of the charging circuit upon the flash bulb. The operation of this synchronizing device works upon the trigger circuit as a means for initiating its operation, by grounding same, in synchronous relation with the camera shutter. The operation of rod 15 upon the above mentioned flexible cable is so adjusted that at the completion of its operational stroke the camera shutter release mechanism is tripped. It will be understood that the present device may also be employed with other types of flash bulbs and circuits.

Microswitch 29 is intended primarily as a safety circuit breaking device and its operation is connected with that of the synchronizing apparatus itself. The microswitch is closed by the action of shoulder 32 of tripper arm 24 upon lever 33 during the inward movement of the tripper arm in the trigger release operation of the apparatus from its cocked position. Any slight pressure by 32 on 33 causes the contacts 30 and 31 of the microswitch 29 to close.

Thus, as long as pressure is maintained on tripper harm 24, the circuit through the microswitch, the cylinder 19, shoulder 20, and to ground is closed. However, when manual pressure is released from the tripper arm, after the operational stroke of rod 15, spring 22 forcing against latch 21 pushes the tripper arm back to its original position, thus causing the circuit to be broken through the microswitch, eliminating the necessity for cocking the apparatus to break the circuit.

I claim:

1. A device of the class described, comprising: a casing having registered openings at its opposed ends, and operating rod passing through said casing and through said openings, said rod having a withdrawn or cocked position and a retracted position, means operable to latch the rod in its cocked position, tripping means to release said rod from its cocked position, resilient means within the casing for moving said rod through an operational stroke from the cocked to the retracted position, said rod having means at one end adapted to operate a camera shutter, electrical switch means within the casing operable to its closed position at the end of the operational stroke, and a second switch in series with said switch means and operable by said tripping means to its closed position and operable to its open position upon the conclusion of the tripping operation and release of the tripping means, said switches cooperating to control the operation of a flash bulb.

2. A device for synchronously controlling the combined operation of a camera shutter and the discharge of a flash bulb having a control circuit, comprising a housing, a shouldered operating rod substantially enclosed therein and projecting therefrom, said rod having a cocked or withdrawn position and a retracted position, an operating spring for moving said rod through an operational stroke from the cocked to the retracted positions, an electrically conducting element positioned in said housing but electrically insulated from the operating rod and the outer housing, said conducting element forming an abutment for engaging the shoulder on the operating rod and for arresting the operational stroke of said rod, a transversely movable latch cooperating with said shoulder for holding said rod in a cocked or withdrawn position, a tripper arm for releasing the operating rod from cocked position, and a circuit breaking switch electrically interposed between the electrically conducting element and the control circuit and operable by the tripper arm to its closed position and operable to its open position upon release of the tripping means, one end of the operating rod having means for releasing the shutter during its operational stroke, the completion of the operational stroke bringing said rod in contact with the electrically conducting element thereby completing the control circuit electrically connected thereto, thus effecting the discharge of the flash bulb.

ARTHUR KENNEDY.

REFERENCES CITED

The following references are of record in the file of this patent:

UNITED STATES PATENTS

| Number | Name | Date |
|---|---|---|
| 1,997,315 | Schwartz | Apr. 9, 1935 |
| 2,081,783 | Watson | May 25, 1937 |
| 2,234,652 | Prager | Mar. 11, 1941 |
| 2,297,111 | Paul | Sept. 29, 1942 |
| 2,308,017 | Mihalyi | Jan. 12, 1943 |
| 2,314,829 | Hunter | Mar. 23, 1943 |
| 2,321,945 | Schwartz et al. | June 15, 1943 |
| 2,328,831 | Mendelsohn | Sept. 7, 1943 |

FOREIGN PATENTS

| Number | Country | Date |
|---|---|---|
| 163,570 | Switzerland | Oct. 16, 1933 |